United States Patent [19]

Kuper

[11] 4,305,775

[45] Dec. 15, 1981

[54] MACHINE FOR ASSEMBLING STRIPS OF VENEER

[75] Inventor: Hans-Heinrich Kuper, Rietberg, Fed. Rep. of Germany

[73] Assignee: Firma Heinrich Kuper, Rietberg, Fed. Rep. of Germany

[21] Appl. No.: 131,946

[22] Filed: Mar. 21, 1980

[30] Foreign Application Priority Data

Mar. 24, 1979 [DE] Fed. Rep. of Germany ....... 2911611

[51] Int. Cl.³ ............................................. B32B 31/00

[52] U.S. Cl. ................................ 156/558; 24/221 R; 242/130; 242/131

[58] Field of Search .................. 242/130, 130.1, 130.2, 242/131, 131.1; 24/221 R, 221 A, 221 K; 156/558, 544, 304.3

[56] References Cited

U.S. PATENT DOCUMENTS

| | | | |
|---|---|---|---|
| 2,735,629 | 2/1956 | Hicks et al. | 24/221 R |
| 3,660,206 | 5/1972 | Ortel | 156/558 X |
| 3,875,368 | 4/1975 | Biewald | 156/577 X |

*Primary Examiner*—David A. Simmons
*Attorney, Agent, or Firm*—Fleit & Jacobson

[57] ABSTRACT

In a veneer assembling machine in which an adhesive thread is adhesively applied over the joint between two strips of veneer, a spool (26) is detachably secured to a machine base plate (27) in a receiving ring (31). A ring shoulder (28) engaging in the receiving ring (31) at the end of the spool (26) is thus provided with sliding tracks (29) and with adjacent indentations (30) in which a machine end stop pin (38) engages. A thrust ring (33) is resiliently mounted in the receiving ring (31) and presses against the ring shoulder (28) from below and tensions the spool (26).

14 Claims, 8 Drawing Figures

Fig. 1
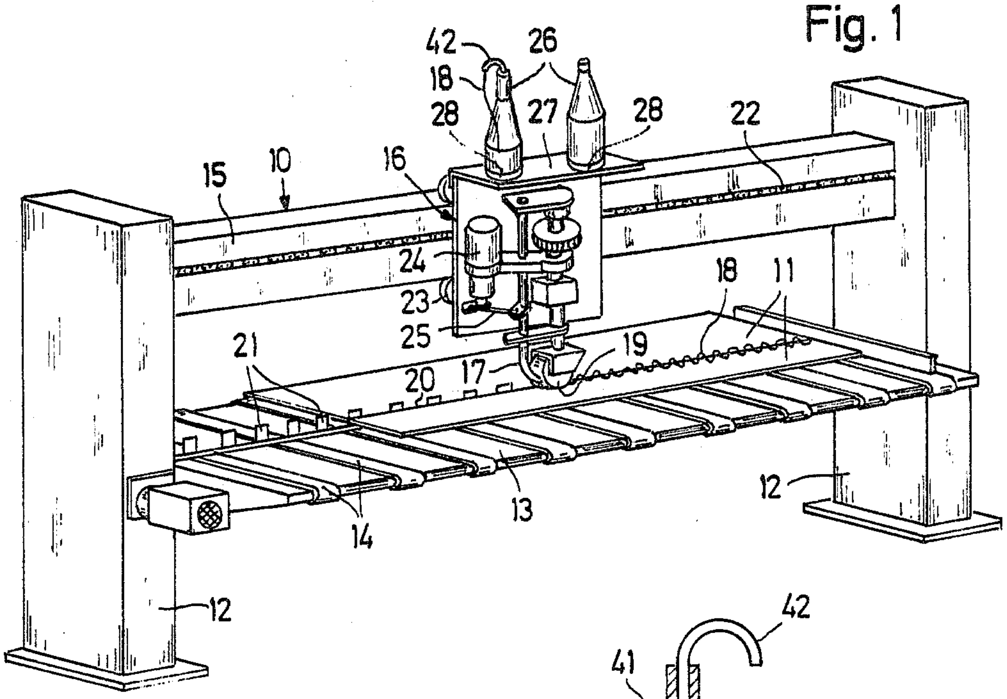
Fig. 3
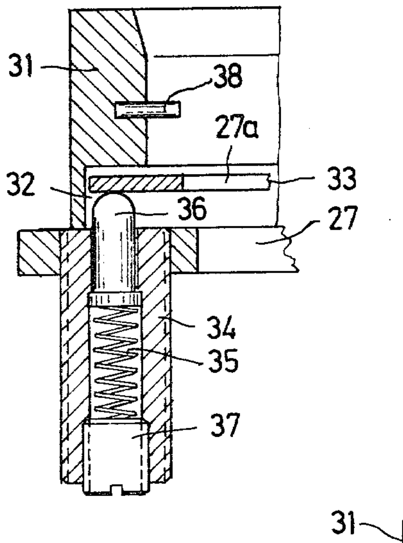
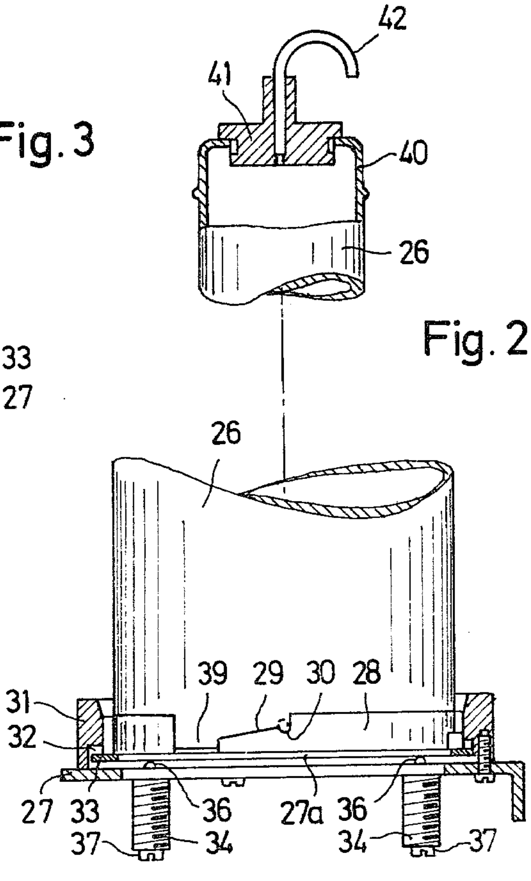
Fig. 2

Fig.8
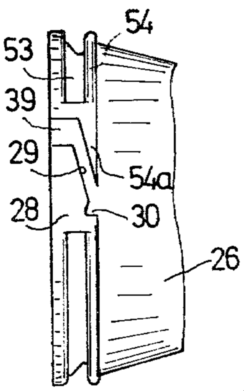
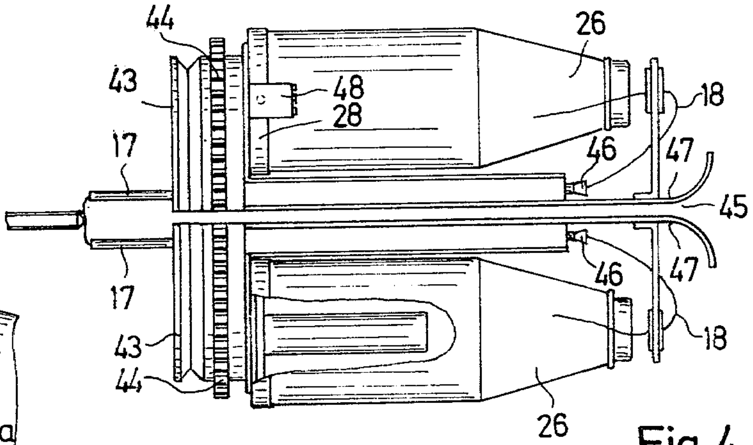
Fig.4
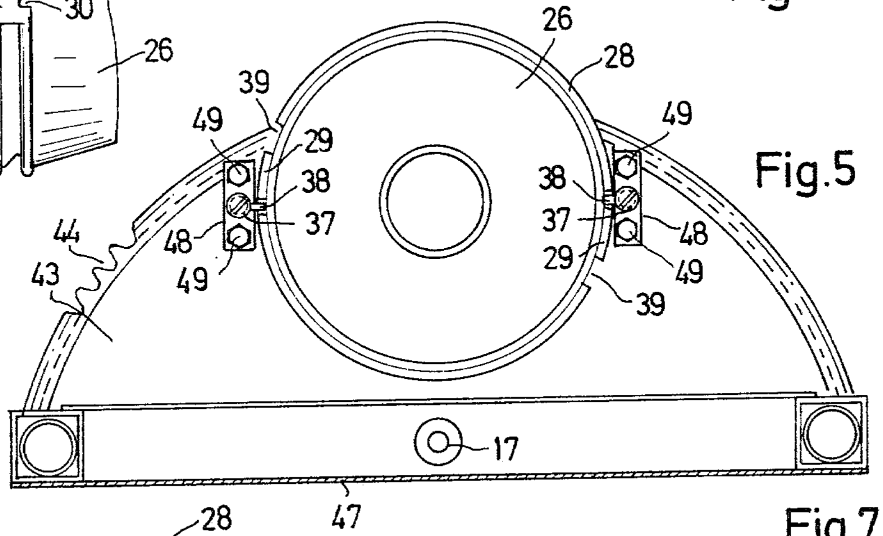
Fig.5
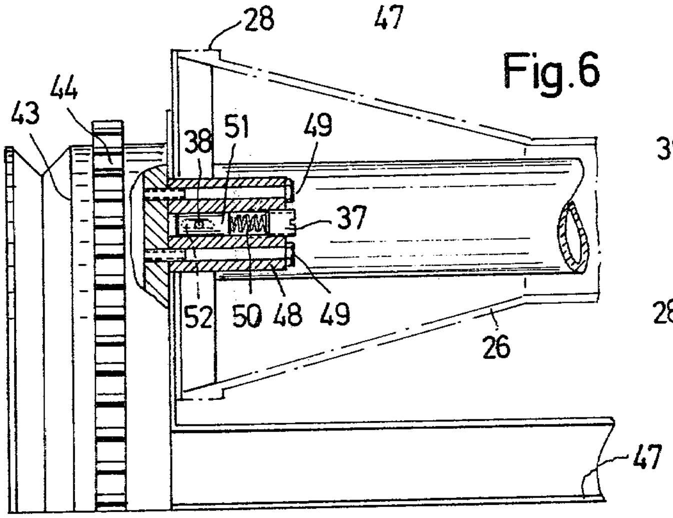
Fig.6
Fig.7
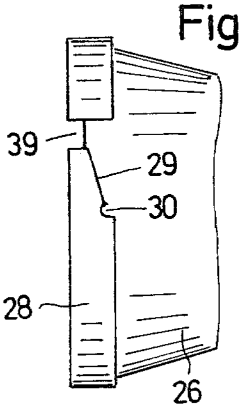

MACHINE FOR ASSEMBLING STRIPS OF VENEER

BACKGROUND OF THE INVENTION

1. Field of the Invention

The present invention relates to a machine for assembling strips of veneer or the like by applying an adhesive thread unwound from a substantially sleeve-like reel or spool and heated in or on a thread guide device and guided to the adjacent veneers and also the development of a spool for receiving the adhesive thread as storage container.

2. Description of the Prior Art

In known machines of the aforesaid kind the strips of veneer are located during assembly along lowerable separating webs on a supporting table. The strips of veneer retain an unchanged direction of passage in the machine, whilst the adhesive thread is supplied by a thread guide device in the region of the given connecting joint in regular windings (undulated) to the strips of veneer (thereby alternately overlapping the edge strips thereof) where it is pressed on by a pressing roller. The thread spools require a good hold so as not to change their position during the unwinding of the adhesive thread—especially in cases in which the spool is displaced by means of a reciprocating guide device at right angles to the direction of passage of the strips of veneer.

SUMMARY OF THE INVENTION

The object of the invention is the improvement of a machine with adhesive thread spool of the above kind in such a manner that a favourable adhesive thread spool holder and construction is provided which is simple to replace and leaves the access to the interior in the adhesive thread spool exposed.

The object is attained in accordance with the invention in a machine of the aforesaid kind in that a sleeve-like spool is provided with an annular shoulder at the end of its portion provided with the greater external diameter and by means of this shoulder is securely but interchangeably coupled by using a plug connection to a base plate located in the region of the thread guide member for the adhesive thread.

The base plate retaining one or more spools for adhesive thread may, for example, be rectangular or square and be located on a horizontal plane in a slide guided in a traverse. The base plate thus preferably has an annular shoulder on its surface for a vertical plug connection and this shoulder is in operative engagement with the receiving ring of the spool of the adhesive thread (bayonet fitting).

Within the scope of such a bayonet fitting, the annular shoulder of the spool offset through 180° has a kind of recess having sliding tracks rising upwards in an opposite direction and to which an indentation is adjacent and in which indentation a resilient pin engages locking in the receiving ring.

Also appertaining to the bayonet fitting as a device for detachably securing the adhesive thread spool, preferably there is proposed, for the vertical plug connection between spool and base plate in the edge region of the spool, two threaded bushes opposed by 180° and inserted which receive inserted therein a cylindrical bolt or pin subjected to spring pressure, which abuts from below against the annular edge and presses the latter upwardly together with the annular shoulder and adhesive thread spool.

In accordance with the invention the adhesive thread is unwound, and preferably towards the inside (through the interior of the spool). In this connection, a profile insert having a bent spout, lip or nozzle is located in the neck extension, this lip is rotatably mounted in the profile insert for a fault-free thread guidance. Such thread guidance avoids any damage to the adhesive thread and improves its unwinding from the thread spool which may also have a lower overall height since a separate thread guide above is omitted.

In a modified arrangement of the adhesive thread spool in a horizontal plane, for example, in devices for changing the thread from the top downwardly, the spool may be detachably secured to the circular segment body by means of a bayonet fitting. The displacement plane and direction of the strips of veneer is located horizontally and extends between two bodies of circle segment shape which are so formed and arranged that a longitudinal slot is formed between them as passage for the strips of veneer.

Each of the aforesaid circle segment bodies has two opposing holders each of which contains a pin guided in a slot, whereby this pin, with the thread spool mounted, engages in the indentation formed in the annular shoulder on the adhesive thread spool located directly behind the sliding track. The holders are secured to the circle segment bodies concerned by means of screw bolts and form a secure but detachable unit therewith.

The thread guide device is located between the adhesive thread spool detachably mounted on the vertical base plate and a guide plate for the strips of veneer, and which guide device supports a conical mouthpiece at the thread inlet.

Each circle segment body for the purpose of driving the rotary movement may be provided with a gear ring on the outer circumference of its cylindrical jacket portion.

BRIEF DESCRIPTION OF THE DRAWINGS

The invention will be described further, by way of example, with reference to the accompanying drawings, in which:

FIG. 1 is a perspective view of a machine for assembling strips of veneer with a spool secured to a vertical base plate;

FIG. 2 is a side view of the base plate with spool and bayonet fitting fitted with mounted nozzle or lip partly in section;

FIG. 3 is a cross-section of the base plate with a resiliently mounted receiving ring corresponding to FIG. 2;

FIG. 4 is an elevation of a further embodiment in which the spools are located in the horizontal plane on segments in a thread changing device;

FIG. 5 is an end view of the same spool with segment body and stop device;

FIG. 6 is a side view, partly in section, of the same segment body with stop device;

FIG. 7 is a side view of the securing part of a spool with receiving ring and guide track; and FIG. 8 is a side view of the securing portion of a modified spool with receiving ring and guide track.

DESCRIPTION OF THE PREFERRED EMBODIMENTS

A machine for assembling strips of veneer 11 comprises in known manner, two vertical uprights 12, having a supporting table 13 extending therebetween substantially half-way up their height. This supporting table 13 is fitted with front and rear conveyor belts 14 which receive their direction of movement via reversing rollers.

Above the supporting table 13 a cross member or traverse 15 is secured to the upright 12 and serves for the guidance of a slide 16. A thread guide or ducting tube 17 is mounted on the slide 16 for guiding heated adhesive filament or thread 18. The thread guide 17 and a pressure roller 19, are reciprocated together with the slide 16, on the traverse 15 in a straight line between the uprights 12. Both the tube and roller are located facing downwards, so that the thread guide tube 17 may be laterally displaced over the so-called connecting joint 20. Moreover, the pressure roller 19 can be in rolling engagement over the two strips of veneer 11 along this connecting joint 20 and presses the heated adhesive thread 18 in position.

To retain the connecting joint 20 in its position, mutually spaced apart, flat stops 21 are provided and lowerable along a straight line. These stops 21 move downwardly from the connecting joint 20 to the extent of the thread guide tube 17 and the pressure roller 19 over the connecting joint 20, (as is disclosed in copending U.S. application No. 906622).

The movements of the slide 16 are determined by a conveyor chain 22 which is coupled to a drive by suitable means. The slide 16 is provided with rollers 23 which are in rolling engagement with the traverse 15 when the slide 16 moves along the traverse 15.

To allow the machine 10 to operate both during the forward travel of the slide 16 on the traverse 15 and during the return travel and to produce a connection between the strips of veneer 11, the thread guide tube 17 may be pivoted about the pressure roller 19, for example, through 180°. The reciprocating movement of the thread guide tube 17 is produced by the drive motor 24 via a crank gear 25, which causes the thread guide tube 17 to execute pivotal movements about its longitudinal axis.

As shown in FIG. 1, spools 26 of adhesive thread having adhesive thread 18 wound thereon are located on a support plate 27 of the slide 16. The plate 27 is horizontally secured at right angles to the slide 16. According to the embodiment this plate 27 carries two upright adhesive thread spools 26. These spools 26 are secured in the manner of a bayonet fitting. For this purpose, the adhesive thread spool 26 is provided at its foot end (at its end having a large outer diameter) with an annular shoulder 28 which is provided with a sliding track 29 having a graduation offset through 180° and having a sliding track 29 rising upwards in the opposite direction and, at the end of which an indentation 30 is located. Furthermore, for holding the adhesive thread spool 26 in the manner of a bayonet-fitting, a receiving ring 31 for each spool is secured (by means of screws or the like) to the base plate 27. On the lower end of the receiving ring 31 an inner recess 32 is provided for receiving a separate pressure ring 33. Furthermore, the base plate 27 is provided with threaded sleeves 34 inserted from below and which are located in the edge region. In each threaded sleeve 34 a cylindrical bolt or pin 36 is mounted and subjected to the pressure of a spring 35 mutually pressing the thrust ring 33 urging such against the recess 32 and wherein the spring force may be regulated via a set ring screw 37.

For securing the adhesive thread spool 26, the latter is inserted with its mounted ring shoulder 28 in the receiving ring 31 in such a manner that the cylindrical pins 36 are pressed by the thrust ring 33 engaging in the recess 32 into the threaded sleeve 34 to such an extent that the sliding track 29 assumes a position in front of stop pin 38. The adhesive thread spool 26 is now rotated to such an extent until the stop pin 38 strikes against the corresponding sliding track 29 and engages in the adjacent indentation 30. The cylindrical pin 36 located adjacent the end region of the adhesive thread spool 26 ensures a reliable location of the adhesive thread spool 26 whilst including the spring 35 and the thrust ring 33 inserted in the receiving ring 31 in the axial direction of the adhesive thread spool 26, see FIGS. 2 and 3.

When the spool 26 of adhesive thread has to be changed, it is pressed downwards together with its ring shoulder 28 to such an extent until the stop pin 38 is freely located over the indentation 30 and may be removed by a turning movement against the direction of the adhesive thread spool 26.

The stop pin 38 thus slides off along the sliding track 29 until it is located in an axially formed opening 39 of the ring shoulder 28. The adhesive thread spool 26 may now be removed.

In the spools 26 shown in FIG. 1, the adhesive thread 18 is drawn-off (unwound) outwardly from the adhesive thread spool 26 and led into the interior of the spool. To prevent the adhesive thread 18 from breaking at the neck extension 40 of the adhesive thread spool 26, this neck extension 40 has a shaped insert 41 insertably located therein and which holds a curved tube or lip 42 or the like guide, see FIG. 2. During the unwinding of the adhesive thread 18 from the outer jacket of the adhesive thread spool 26, the lip 42 rotates therewith and is adapted to any position of the unwinding or "payout" speed. The adhesive thread 18 which is led via the lip 42 into the interior of the adhesive thread spool 26, is fed through the interior of the adhesive thread spool 26 via a passage or aperture 27*a* in the base plate 27 and to the thread supply tube 17. Due to this substantially vertical arrangement an undisturbed supply of adhesive thread 18 is ensured.

In an alternative embodiment of the invention, illustrated in FIGS. 4 to 7, spools 26 of adhesive thread are located in a horizontal plane. The thread change device for strips of veneer 11 is formed by two-part circular, rotatably mounted circle segment bodies 43, assembled in circular disposition, which for the purpose of drive are fitted on the outer circumference of their cylindrical jacket portion with a gear ring 44. A slot 45 is formed between the two circle segment bodies 43 as passage for the strips of veneer 11. The thread guide tube 17 for the adhesive thread 18 supports a conical mouthpiece 46 and is inserted between the adhesive thread spool 26 and a guide plate 47 for strips of veneer 11.

In this embodiment the adhesive thread spools 26 are secured to the circle segment bodies 43 in the manner of a bayonet catch also. The lower end of the adhesive thread spool 26 is adapted as already described. Each circle segment body 43 has two holders 48 or the like for the secure clamping of the adhesive thread spool 26 and the holders 48 are secured by screws 49.

The holder 48, as shown in FIG. 6, has a stop pin 38 which is secured to a slide member 51 by means of a spring 50 and which is subject to pressure. This stop pin 38 is guided in a slot 52 formed in the wall of the holder 48 and constantly urged by the spring 50 in the direction towards the circular segment member 43, whereby the spring 50 is supported against an adjustment screw 37.

Thus, if the adhesive thread spool 26 is to be located in the holders 48, then the adhesive thread spool 26 is inserted between the two holders 48 in such a manner that each of the opposite apertures 39 in the ring shoulder 28 register with the pin 38 located at the corresponding position in the holder 48. On rotation of the adhesive thread spool 26 in the corresponding direction, the stop pin 38 moves against the pressure of the spring 50 impacting it upwardly along the sliding track 29 of the ring shoulder 28 to such an extent until it engages in the indentation 30 due to the pressure of the spring 50. The adhesive thread spool 26 is now satisfactorily retained in every respect.

To replace an empty adhesive thread spool 26, it is necessary for the stop pin 38 to be drawn upwardly to such an extent against the pressure of the spring 50 until it is located outside the indentation 30. During the renewed rotary movement of the adhesive thread spool 26, but this time in the opposite direction, the stop pin 38 slides along the sliding track 29 towards the aperture 38 in the ring shoulder 28. The adhesive thread spool 26 may now be removed from the two holders 48.

In the embodiment shown in FIG. 8 of a modified securing portion of the same adhesive thread spool 26, the ring shoulder 28 has an encircling groove 53, which on the one hand, presents a static reinforcement and, on the other hand, achieves a material saving on the ring shoulder 28.

In the region of the axially located aperture 39 and the adjoining inclined sliding track 29 one encircling bead 54 (adjacent to the groove 53) of the ring shoulder 28 exposes to one side a bead extension 54*a* such that the latter leaves only a small gap free in the region of the indentation 30 for insertion of the stop pin 38. This method of bead extension 54*a* reduces the interruption in the ring shoulder 28 relative to the embodiment of FIG. 7, so that in the wrapped state the adhesive threads 18 find a better (greater) abutment area in the region of the ring shoulder 28.

I claim:

1. An adhesive thread spool comprising a spool for adhesive thread, and a ring shoulder encompassing one end of the spool and having an indentation for receiving a stop pin of an apparatus for detachable securing of the thread spool to a machine for assembling strips of veneer, and an inclined slide track for guiding the stop pin into the indentation.

2. An adhesive thread spool according to claim 1, wherein the ring shoulder has an axial aperture formed at a lower end of the inclined slide track.

3. An adhesive thread spool according to claim 1 or 2, wherein the ring shoulder on the spool has graduations offset through 180° with sliding tracks rising upwardly in opposite directions, an indentation being provided at an upper portion of each track into which the stop pin engages to lock in the manner of a bayonet fitting.

4. An apparatus for the detachable securing of an interchangeable sleeve-like spool for adhesive thread to a machine for assembling strips of veneer, the apparatus comprising a ring shoulder provided at one end of a spool for adhesive thread, a machine end base plate, a receiving ring operatively connected to the ring shoulder of the adhesive thread spool located on the surface of the machine end base plate, the receiving ring having a recess inside at its lower end, and a thrust ring positioned at least partially in the recess for exerting a force on the spool.

5. An apparatus for detachable securing as claimed in claim 4, wherein the base plate has threaded sleeves offset on its underside in an edge region of the thread spool, the sleeves having pins located therein and springs biasing the pins to act on the thrust ring in the receiving ring.

6. An apparatus for detachable securing according to claim 4 or 5, further comprising a stop pin arranged on the spool receiving plate and wherein the ring shoulder has an outer inclined slide track arranged on the machine-side end of the adhesive thread spool, and against which shoulder there abuts the stop pin to replaceably secure the ring shoulder.

7. Apparatus for detachable securing according to claim 4 or 5, wherein the thrust ring between the ring shoulder of the adhesive thread spool and the base plate is resiliently impacted and displaceably mounted in the receiving ring.

8. An apparatus for detachable securing according to claim 4 or 5, wherein the base plate has a rectangular shape, and wherein a slide is mounted on a cross beam and arranged displaceable along a horizontal plane, the base plate being secured to the slide.

9. An apparatus for detachable securing according to claim 4 or 5, wherein the base plate has a passage aperture formed therein for adhesive thread emanating from the interior of the adhesive thread spool.

10. An apparatus for detachable securing according to claim 6, wherein the apparatus includes a circle segment body supporting a holder for the spool, and wherein the stop pin is secured to the spool holder.

11. An apparatus according to claim 10, wherein the stop pin is resiliently mounted on the spool holder.

12. An apparatus as claimed in claim 6, wherein the base plate has a passage aperture formed therein for adhesive thread emanating from the interior of the adhesive thread spool.

13. A spool for adhesive thread for use with a machine for assembling strips of veneer by adhesively applying an adhesive thread unwound from a spool, the spool having a large ring shoulder located at a foot end, the ring shoulder including a sliding track formed as a guide surface for a stop pin of the machine, a profile insert being provided in a neck extension of the spool and having a lip rotatably mounted therein for guiding the adhesive thread arranged from the outside and extending into the interior.

14. A spool for adhesive thread as claimed in claim 13, wherein the ring shoulder has two graduations offset through 180°, and sliding tracks rising upwards in opposite directions and adjoined by an indentations for receiving said stop pin.

* * * * *